United States Patent [19]

Letterman

[11] Patent Number: 4,622,091
[45] Date of Patent: Nov. 11, 1986

[54] RESIN FILM INFUSION PROCESS AND APPARATUS

[75] Inventor: Leslie E. Letterman, Seattle, Wash.

[73] Assignee: The Boeing Company, Seattle, Wash.

[21] Appl. No.: 676,427

[22] Filed: Nov. 29, 1984

[51] Int. Cl.$^4$ .......................................... B32B 31/20
[52] U.S. Cl. .................................. 156/286; 156/87; 156/289; 156/309.6; 156/323; 156/382; 428/109; 428/110; 428/111; 428/116
[58] Field of Search ................ 156/87, 285, 286, 289, 156/309.6, 323, 382; 428/73, 109, 110, 111, 114, 116

[56] References Cited

U.S. PATENT DOCUMENTS

| | | |
|---|---|---|
| 2,951,004 | 8/1960 | Martin et al. |
| 3,026,228 | 3/1962 | Robinson et al. |
| 3,231,460 | 1/1966 | Andrews. |
| 3,666,615 | 5/1972 | Iwai et al. |
| 3,695,967 | 10/1972 | Ross .................................. 156/209 |
| 3,703,422 | 11/1972 | Yoshino ........................ 156/286 X |
| 3,723,214 | 3/1973 | Meraz, Jr. ............................. 156/37 |
| 3,867,224 | 2/1975 | Jacobs et al. ....................... 156/182 |
| 3,885,071 | 5/1975 | Blad et al. ............................. 428/60 |
| 4,065,340 | 12/1977 | Dickerson .......................... 156/154 |
| 4,165,404 | 8/1979 | Quehl ................................. 428/212 |
| 4,194,618 | 3/1980 | Malloy ................................ 206/205 |
| 4,290,838 | 9/1981 | Reavill et al. ...................... 156/286 |
| 4,292,356 | 9/1981 | Whitemore et al. ............ 156/286 X |
| 4,445,951 | 5/1984 | Lind et al. ..................... 156/309.6 X |
| 4,496,024 | 1/1985 | Wolf et al. ................... 156/309.6 X |

Primary Examiner—Robert A. Dawson
Attorney, Agent, or Firm—Christensen, O'Connor, Johnson & Kindness

[57] ABSTRACT

A method and apparatus for creating monolithic structures formed of fiber reinforced resin composites, i.e., layers or plies bonded together by a cured resin is disclosed. A plurality of dry plies (13, 15, 17, 19) are stacked to create a dry preform (11). The orientation of the plies is based on the desired directional strength of the resulting structure. The plies may or may not be stitched in the cross-ply direction, as desired. After the dry preform (11) is created, one or more layers of liquid or solid resin (21) are added. The dry preform and the resin layer(s), which are located atop a forming tool (33), are enclosed by resin content control envelope (35) through which breather tape (49) passes. The resin content control envelope (35) is, in turn, enclosed by a vacuum envelope (37). First air and other gases are withdrawn and, then, the composite is heated, causing the resin to flow into the dry preform (11). As the resin (21) enters the dry preform (11), air and other gases remaining in the dry preform (or created as the resin cures) are withdrawn via the conduit created by the dry preform fibers and various regions of breather tape (45, 49, 63).

52 Claims, 10 Drawing Figures

RESIN FILM INFUSION PROCESS AND APPARATUS

TECHNICAL AREA

This invention relates to fiber reinforced resin composites.

BACKGROUND OF THE INVENTION

In recent years the use of high-strength-to-weight ratio fiber reinforced resin composites has continuously expanded, particularly in weight-sensitive, products, such as aircraft and space vehicles. Prior to the present invention, the fiber reinforced resin composites used in such products have usually been created by forming a layup, e.g., a stack, of layers or plies, the layers or plies being formed of unidirectional or multidirectional (e.g., woven) fabrics made of glass or graphite fibers impregnated with a resin. Such preimpregnated plies are commonly referred to as "prepreg" plies or simply prepreg. Normally the layup is positioned atop a forming tool, which, in its simpliest form, may comprise a flat plate. After the layup is prepared, heat and pressure are applied. The heat cures the resin and the pressure compresses the layup preventing air and other gases, including volatile gases, from forming porosity (bubbles) as the resin cures. Normally an autoclave is used to apply the necessary heat and pressure.

While monolithic structures formed of fiber reinforced resin composites processed in the manner described above are satisfactory in some environments, they have certain disadvantages. For example, it has become desirable to provide cross-ply reinforcement in order to increase resistance to "in-plane" compression load failure, particularly after limited input damage. In-plane loads are those lying in the plane of the plies. Cross-ply reinforcement (sometimes referred to as Z-direction reinforcement) is created by cross-ply stitching a layup. While this idea is uncomplicated in theory, in the past its implementation has been difficult. The difficulty occurs because the plies are preimpregnated with resin, which is sticky. The sticky resin makes it extremely difficult to cross-ply stitch the fiber layers together.

Another disadvantage of using fiber plies preimpregnated with resin is the difficulty of removing gases trapped between the plies when a layup is formed and the gases produced in the layup when the resin is being cured. While the pressure applied during curing forces most entrapped gases into solution (in the same way water is prevented from boiling at elevated pressure), some bubbles still form, resulting in weakening voids in the resultant monolithic structure.

A further disadvantage associated with the use of preimpregnated fiber plies is the need to store such plies at a low temperature and the losses associated with the failure to use such plies in a timely manner. More specifically, as will readily be appreciated by those familiar with resins used to create fiber reinforced resin composites, the rate of resin curing is accelerated when resin temperature is raised. Conversely, the rate of resin curing is retarded by low temperatures. As a result, conventionally, prior to use, preimpregnated fiber reinforced layers (which are usually in the form of relatively wide tape or fabric on rolls prior to being laid up) are stored in a refrigerated environment. Since the low storage temperature impedes resin curing, the usable life of prepreg is increased. The disadvantage of this technique is that because the fiber and resin form a unitary structure, the fiber, as well as the resin, must be stored. As a result, a relatively large amount of storage capacity is required. A further disadvantage is that even at low temperatures resin cures, albeit at a slower rate. As a result, at some point, even prepreg stored at low temperature become unusable and must be disposed of. That is, even though the resin is the only portion of the prepreg that becomes useless, the fiber as well as the resin must be disposed of because the resin is impregnated into the fiber.

The invention is directed to avoiding the disadvantages of creating monolithic structures from preimpregnated fibrous layers. More specifically, the invention is directed to providing a method and apparatus for creating fiber reinforced resin composites that can be easily cross-ply stitched and are formed in a manner that substantially reduces if not entirely eliminates weakening voids created by trapped gases by removing such gases prior to and during the infusion of the resin. Further, the invention is directed to providing a method and apparatus suitable for creating fiber reinforced resin composites that substantially reduces the amount of waste resulting from the curing of stored resins and the rejection of prepreg material due to poor quality.

SUMMARY OF THE INVENTION

In accordance with this invention a method and apparatus for creating monolithic structures formed of fiber reinforced resin composites, i.e., layers or plies of continuous fiber (woven, knitted, braided, mat, felt, etc.) integrally supported and bonded together by a cured resin, is provided. In accordance with the invention a plurality of dry fiber plies are layered to create a dry preform. As in the past, the orientation of the various plies is based on the desired directional strength of the resulting monolithic structure. Preferably the plies are stitched together in the cross-ply direction even though such is not required by the invention. At least one layer of resin is added to the dry preform. While, preferably, the resin is in the form of a single layer of tiles laid atop the dry preform, the resin may take on other forms. It may be liquid; or the resin layer may be a unitary layer rather than a layer formed of tiles. Further, the resin may be located in more than one layer. For example, in addition to a layer located atop the dry preform, a layer may be located beneath the dry preform or the dry preform may be in two or more pieces separated by a layer of resin. In any event, the dry preform and the resin layer(s) are enclosed by a resin content control envelope through which a conduit such as breather tape, passes. The resin content control envelope is, in turn, enclosed by a vacuum envelope. First, air and other gases are withdrawn via the envelopes. Thereafter, the composite is heated. As the resin enters the preform, air and other gases remaining in the preform are withdrawn via the conduit created by the fibers that form the preform and the breather tape.

In accordance with other aspects of this invention, preferably, the dry preform and resin layer(s) are located on a tool, which may form part of the vacuum envelope. The tool may be separated from the dry preform and resin layer(s) by a release film, which then forms part of the resin content control envelope. The tool molds the adjacent surface of the fiber reinforced resin composite as it is being formed.

In accordance with further aspects of this invention, a center core formed of wood, foam, honeycomb or some other material may be located between layers of the dry preform. Alternatively, or in addition, preform doubler plies may be located on one side of the preform to create elongate reinforcing regions.

In accordance with still other aspects of this invention, the resin layer tiles are held together by a scrim cloth and separated from the dry preform by a perforated release film prior to curing the resin. As the resin is heated, it flows through the perforations in the perforated release film, which allows the scrim cloth to be easily removed after the monolithic structure is formed.

In accordance with still further aspects of this invention, a second tool located on the other side of the dry preform and resin layer(s) from the first tool is used to mold the opposed surface of the fiber reinforced composite structure as it is being formed. The tool can be separated from the upper resin layer by a release layer. Alternatively, the tool can be perforated and located between the resin layer and the dry preform, the perforations in the perforated tool allowing the resin to flow into the dry preform during curing.

As will be readily appreciated from the foregoing description, the invention provides a new and improved method and apparatus for creating monolithic structures formed of fiber reinforced resin composites. The method and apparatus overcomes the disadvantages of prepreg methods and apparatus. Specifically, because the preform is dry, i.e., not impregnated with a resin, cross-ply stitching is relatively easy. Further, because the resin flows into the dry fiber plies during curing and because a gas path is provided through the plies and out of the resin content control envelope, gases (including volatile gases) are not trapped in the fiber reinforced resin composite as it is being formed. And, because the resin is kept separate from the fiber plies, only the resin needs to be refrigerated. If the resin becomes unusable due to its being cured or partially cured while refrigerated, only the resin need be disposed of, not the fiber layers as well. Alternatively, if for some reason, the fiber layers become unusable, only the fiber layers need be disposed of, not the resin as well.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
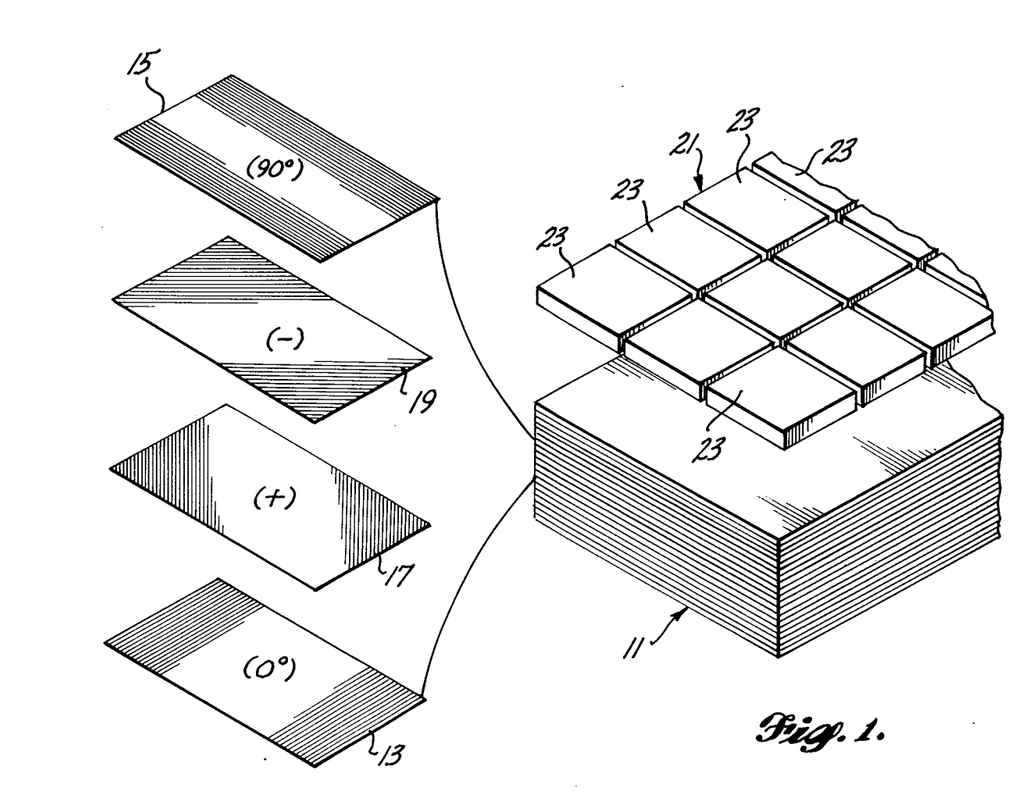
FIG. 1 is a pictorial diagram illustrating a layup, including a dry preform and a layer of resin, formed in accordance with the invention.

FIG. 1 is a pictorial diagram illustrating a layup formed in accordance with the invention. The layup includes a dry preform 11 formed of a plurality of layers or plies 13, 15, 17 and 19. Each ply is formed of a plurality of reinforcing and/or supporting fibers. The fibers may be in any conventional form, such as unidirectional, woven fabric, knitted fabric, swirl mat, felt mat, wound, braided, etc. When unidirectional tape is used, each ply is formed of a plurality of parallel oriented tows. A tow is a loose, essentially untwisted strand of a large number of unidirectional synthetic fibers. Each tow may comprise 1,000, 3,000, 6000 or 12,000 fibers, for example. The tows may be loosely held in position by cross tow stitches. For example,, the tows may be held together by weft insertion knitting stitches. The orientation of the plies is based on the desired directional strength of the resultant fiber reinforced resin composite. As is conventional, some plies lie parallel to a predetermined direction, which is usually the direction of the major force likely to be applied to the resultant monolithic structure. Plies whose tows lie in this direction are commonly referred to as 0° plies. Other plies lie at an angle to the 0° plies. Normally the axis of the tows of some plies lie orthogonal to the tow direction of the 0° plies. These plies are commonly referred to as 90° plies. Plies whose tows lie at some other angle with respect to the direction of the tows of the 0° plies are referred to as + and − plies. Most commonly, the tows of these plies form +45° and −45° angles with respect to the direction of the tows of the 0° plies. The number of 0°, 90°, + and − plies and how they are interleaved is, of course, dependent upon the resultant monolithic structure. Since design techniques for determining the number and orientation of the plies of fiber reinforced resin composites is known to those familiar with the creation of such composites and since such design techniques do not form part of the present invention, they are not described here. It is important to note, however, the major difference between prior art layups and a preform formed in accordance with the invention. Specifically, in the past, layups have been formed from preimpregnated fiber layers. Preimpregnated fiber layers or prepreg are layers of fiber tape or woven fabric that are preimpregnated with a resin. Contrariwise, the ply layers 13, 15, 17 and 19 used to form the dry preform 11 of the invention are not impregnated with a resin, i.e., they are dry.

In addition to the dry preform 11, the layup illustrated in FIG. 1 includes a layer of resin 21. While the layer of resin 21 can be applied as a liquid, preferably, it is solid. Further, while the resin layer 21 may take the form of a unitary sheet, the preferred form of the resin layer 21 is a plurality of tiles 23. Tiles are preferred in environments where the shape of the resultant monolithic structure is to have some configuration other than flat—an airfoil shape, for example. The tiles 23 can be separate items each with an internal scrim cloth that prevents the scattering of broken tile pieces by providing support during handling of the tiles. In summary, a layup formed in accordance with the invention comprises two or more dry fiber plies and at least one layer of resin.

Figure 2:
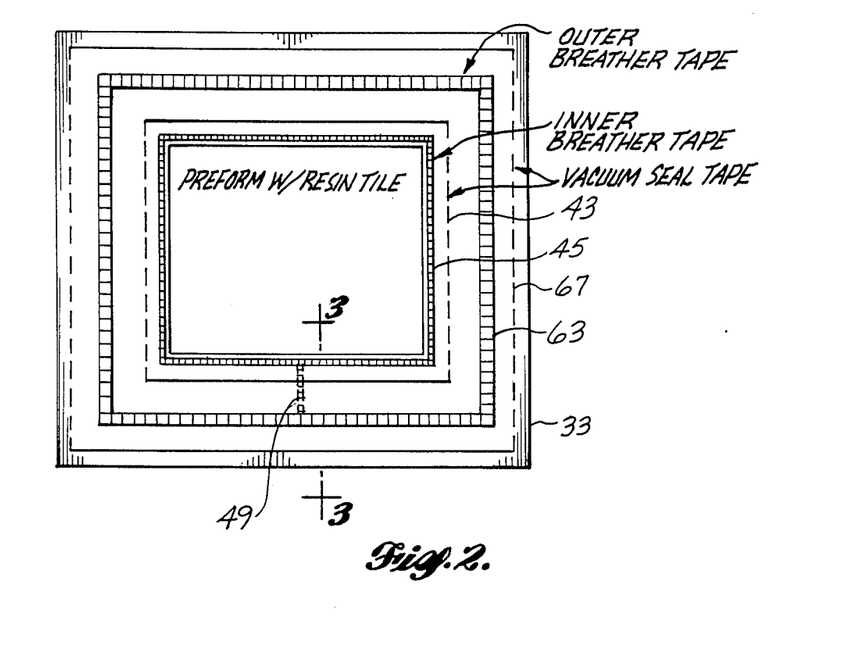
FIG. 2 is a top plan view of an apparatus formed in accordance with the invention for carrying out the process of the invention.
Figure 3:
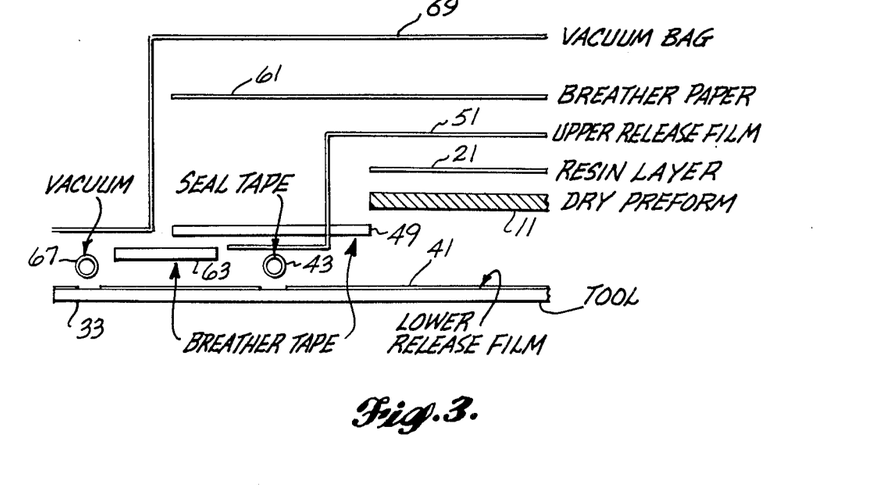
FIG. 3 is an enlarged cross sectional view along line 3—3 of FIG. 2.
Figure 4:
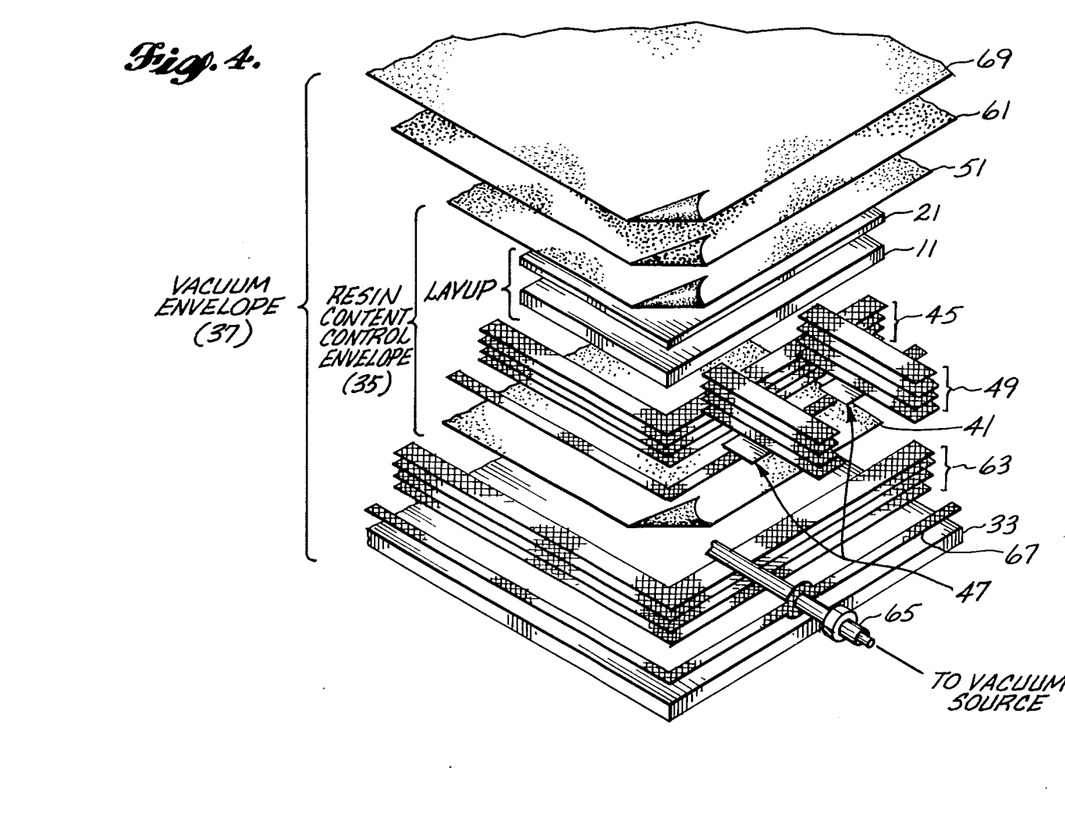
FIG. 4 is an enlarged, exploded isometric view of one corner of the apparatus illustrated in FIG. 2.

As illustrated in FIGS. 2-4, a fiber reinforced resin composite is formed from the dry preform 11 and resin layer 21 by enclosing the dry preform and resin layer in a resin content control envelope 35, which in turn is enclosed in a vacuum envelope 37. The resin content control envelope 35 includes a lower release film 41, which is positioned atop a tool 33. If desired, the lower release film can take the form of a sprayed on release agent. While the tool 33 is illustrated as a flat plate, as will be readily understood by those skilled in the fiber reinforced resin composite art, tools provide form and dimension to the resultant monolithic structure and, thus, can take on a variety of configurations. In its most sophisticated form, a tool may include a complex matched die set.

A predetermined region of the lower release film 41 is surrounded by an inner strip of vacuum seal tape 43. Located inside of the inner strip of vacuum seal tape 43 is one or more inner breather tape layers 45. The inner breather tape layers 45 form a perimeter located just inside of the perimeter defined by the inner strip of vacuum seal tape 43. Positioned atop the inner strip of vacuum seal tape 43 at one or more predetermined locations are vacuum port release film strips 47. Lying atop the vacuum port release film strips 47 are one or more layers of vacuum port breather tape layers 49. The vacuum port breather tape layers 49 create a conduit that extends between the inner breather tape layers 45 and the outside of the resin content control envelope 35. Air and other gases escape from the resin content control envelope 35 via this conduit.

The dry preform 11 and the resin layer 21 are positioned inside of the inner breather tape layers 45. Thus, the dry preform 11 and the resin layer 21 are surrounded by the inner breather tape layers 45, which in turn are surrounded by the inner strip of vacuum seal tape 43, as described above. Overlying the dry preform 11 and resin layer 21, the inner breather tape layers 45 and the inner strip of vacuum seal tape 43 is an upper release film 51. The inner strip of vacuum seal tape 43 joins the lower and upper release films 41 and 51 together to create the resin content control envelope 35. That is, the lower and upper release films 41 and 51 and the inner strip of vacuum seal tape form the resin content control envelope 35 that encloses the dry preform 11 and the resin layer 21. When a vacuum is drawn on the resin content control envelope in the manner hereinafter described, air and other gases are removed from the resin content control envelope 35 via the inner breather tape layers 45 and the vacuum port breather tape layers 49. Air and other gases in the dry preform 11, and leaching from the resin, flow into the inner breather tape layers 45 via the natural conduit created by the interstices in the plies of the dry preform.

The vacuum envelope 37 houses a layer of breather paper 61 that overlies the upper release film 51 and the vacuum port breather tape layers 49. The vacuum envelope 37 includes several outer breather tape layers 63. The outer breather tape layers 63 surround the resin content control envelope 11 and underlie the outer ends of the vacuum port breather tape layers 49. Extending outwardly from and overlying the outer perimeter breather tape layers 63 is a sniffer or vacuum fitting 65. The sniffer or vacuum fitting 65, as noted in FIG. 4, is connected to a suitable vacuum source. As a result, the vacuum source is connected to both the vacuum envelope 37 and the resin content control envelope 35. The pathway into the resin content control envelope extends from the sniffer or vacuum filling 65, through the outer breather tape layers 63 and the vacuum port breather tape layers 49 to the inner breather tape layers 45.

The vacuum envelope 37 also includes an outer strip of vacuum seal tape 67 that surrounds the outer breather tape layers 63. The outer strip of vacuum seal tape 67 runs both above and below the sniffer or vacuum fitting 65. Overlying the outer strip of vacuum seal tape 67 is a layer of vacuum bagging film 69. The layer of vacuum bagging film is formed of a material that is impervious to gases at relatively low pressures. While various materials can be used one that is ideally suited for use in the present invention is sold under the trademark KAPTON by E. I. Dupont de Nemouis, Co., Wilmington, Del. 19898. The vacuum bag also includes the tool 33.

As will be readily appreciated from the foregoing description, the process of the invention first comprises the steps of creating a layup formed of a dry preform that includes at least two plies formed of fiberous material and at least one layer of resin. Next, the dry preform is positioned in contact with an evacuation conduit, such as one or more layers of breather tape. Then, the layup and the evacuation conduit are enclosed in a resin content control envelope through which the evacuation conduit passes. The resin content control envelope is then enclosed in a vacuum envelope. Next, gas within the vacuum envelope is evacuated. Due to the evacuation conduit, gas in the resin content control envelope and the dry preform is evacuated as the vacuum envelope is evacuated. Finally, the vacuum envelope and its contents are evacuated of gas and then heated. As the heating step takes place, the resin infuses into the dry preform creating a fiber reinforced resin composite having very little if any porosity.

One of the main aspects of the invention is enclosing the dry preform and the resin layer(s) in a resin content control envelope and evacuating the resin content control envelope. The lack of a resin content control envelope results in unpredictable resin bleed from the preform. Unpredictable preform resin bleed results in the production of fiber reinforced resin composites whose resin content and, thus, strength is unpredictable. Such composites are unsatisfactory in many environments, such as space vehicles and aircraft. The positioning of the resin content control envelope inside of a vacuum envelope creates a double bag arrangement having a number of advantages that cannot be met by a single bag arrangement. One reason for the double bag arrangement is that release films (TEFLON, for example) used for high temperature (above 250° F.) processing make poor vacuum bags because they are soft and, thus, subject to tearing when they impinge on a sharp object. Second, a double bag arrangement provides a way to port the resin content control envelope at many points. Thus, many escape routes for air and volatiles are provided. If resin flow cuts off some routes others remain. Third, the double bag arrangement creates a glove fit of the resin content control envelope around the preform/resin layup in a way that avoids the need to use large amounts of breather tape to prevent resin from flowing into the vacuum line.

The use of a number of layers of dry fabric breather tape around the periphery of the preform has the advantage of assuring a good vacuum path to all points on the preform, thereby minimizing the chance of gas entrapment by the resin as the resin infuses into the preform and is cured. In this regard, it is important to understand that one of the significant advantages of the invention is that the preform itself forms a vacuum path. Consequently, volatile gases, released by the resin during infusion and curing, travel through the breather tape and escape. This feature clearly distinguishes the invention from prior art prepreg processes. More specifically, in prior art prepreg processes resin traps air between the plies during layup. The resin also traps volatile gases released by the resin during cure. In order to minimize the amount of trapped gas and, the porosity caused by trapped gases, prior prepreg processing requires the use of high autoclave pressures. The invention avoids the absolute need for high pressure. That is, while pressure as well as heat and evacuation may be applied to the evacuation envelope during curing pressure is not an absolute requirement and may be dispensed with in most cases.

Turning now to a detailed description of the steps involved in utilizing the apparatus illustrated in FIGS. 2-4. First, the tool 33 is prepared (cleaned) and, then, the lower release film is placed on the tool. Alternatively to a preformed film, the lower release film can be created by coating the tool with a release agent applied by spraying, brushing, rolling, etc. Next, the layup is created by first forming the dry preform 11 by layering a plurality of dry fiber plies. The dry preform may be formed on the tool; or, it may be formed at another location and transported to the tool. If the resin is in the form of a solid sheet or a sheet of tiles, it is laid atop the dry preform. Alternatively, if the resin is a liquid, it is poured over the preform, preferably in a reticulated pattern. Next, several inner breather tape layers 45, one to three inches wide, are placed along the sides and against the preform. The breather tape layers may extend only a short distance along the preform edge, or around the entire preform perimeter as illustrated in FIG. 2, with surrounding being preferred. Next, the inner strip of vacuum seal tape 43 is run around the entire outer edge (perimeter) of the breather tape layers 45. Preferably the strip of vacuum seal tape is located very close to (almost against) the inner breather tape layers 45. Next, at one or more points (depending upon the size and shape of the preform) small strips of vacuum port release film 47 are laid down over the inner strip of vacuum seal tape 43. The vacuum port release film strips 47 may be about an inch wide by two inches long, for example. Next, several vacuum port breather tape layers 49 are placed atop each vacuum port release film strip 47. Then, the upper release film 51 is placed over the layup and sealed to the inner strip of vacuum seal tape 43. The upper release film 51 need extend only a few inches beyond the edge of the inner strip of vacuum seal tape 43. Next, a vacuum conduit around the perimeter of the thusly formed resin content control envelope 35 is created by placing several outer breather tape layers 63 around the periphery of the resin content control envelope. This run of breather tape provides a vacuum conduit that connects the vacuum port breather tape layers 49 to the sniffer or vacuum fitting 65. Preferably, the outer breather tape layers extend around the entire perimeter of the resin content control envelope 35 and the distance between the vacuum port breather tape layers 49 and the sniffer or vacuum fitting 65 is short. While only a single sniffer is shown, more than one sniffer may be required when the layup is large. Depending upon the size of the various components, the outer breather tape layers are usually positioned about half the distance between the resin content control envelope 35 and the edge of the tool 33. Next, a ply or two of breather paper 61 is laid atop the resin content control envelope 35. Preferably, the breather paper extends to within two or three inches of the edge of the tool 33. The breather paper 61 is added to aid in the evacuation of the vacuum envelope 37. Next, the outer strip of vacuum seal tape 67 is run around the edge of the tool 33 and the layer of vacuum bagging film (e.g., KAPTON) is laid over the entire layup and bonded to the outer strip of vacuum seal tape 67.

After the foregoing assembly is created, vacuum is drawn on the inside of the vacuum envelope 37 via the sniffer or vacuum fitting 65, which may be installed either through the vacuum bag film 69, between the vacuum bag film 69 and the tool 33 (as shown in FIG. 4) or through the tool 33.

In addition to the basic layup arrangement illustrated in FIGS. 1-4 just described, the invention can be used to create monolithic structures from many other layups. FIGS. 5-9 are exemplary illustrations of such layups. The layup illustrated in FIG. 5 includes a plurality of dry preform blankets 75, 77 and 79 laid atop the lower release film 41, which is laid atop the tool 33, as previously described. Next, a plurality of elongate preform doubler plies are laid atop the preform blanket. The doubler plies may be a single ply or a plurality of fiber plies each formed of fabric or unidirectional fibers. The doubler plies are stacked in parallel rows atop the preform blankets 79 to create plateau like build ups. After the preform doubler plies 81, which may be of decreasing width, are stacked atop the preform blankets, the resulting dry preform is covered with a layer of resin tiles 83. The layer of resin tiles 83 has length and width dimensions substantially equal to the length and width dimensions of the preform blankets 75, 77 and 79. Atop the layer of resin tiles 83 are laid strips of resin tiles 85. One strip of resin tiles 85 is aligned with each row of preform doubler plies 81. Next, the upper release film 51 is laid atop the resin tiles followed by the breather paper 61 and the layer of vacuum bagging film 69.

Figure 5:
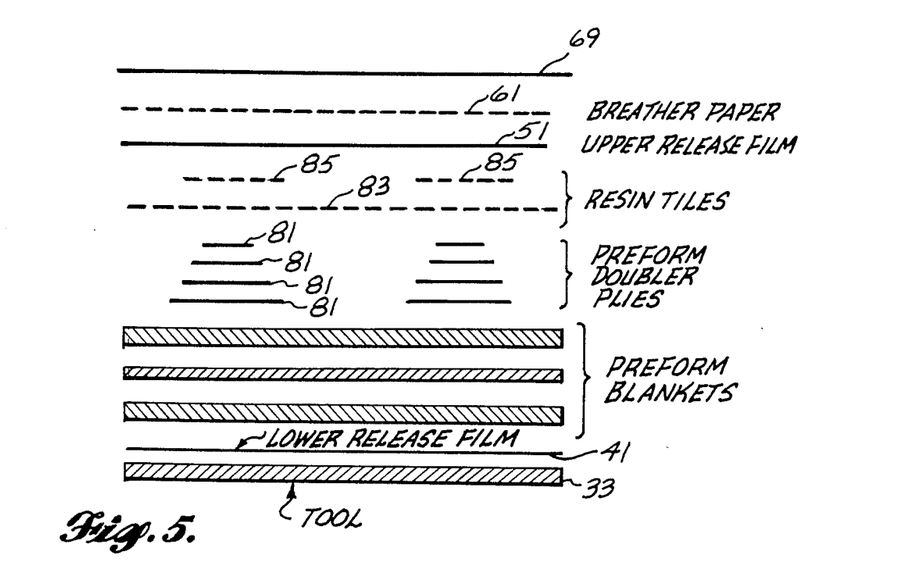
FIG. 5 is a partial cross sectional view of an alternative layup formed in accordance with the invention that includes a plurality of preform doubler plies in addition to the main dry preform.

As will be readily appreciated from the foregoing description of the assembly illustrated in FIG. 5, the difference between the FIG. 5 assembly and the assembly illustrated in FIGS. 2-4 and previously described, is in the nature of the layup. The monolithic structure resulting from the FIG. 5 layup includes a plurality of linear foundations formed by the preform doubler plies 81 for the attachment of runners or stringers. If the preform doubler plies, per se, do not add an adequate amount of stringer reinforcement, additional stringer reinforcement can be achieved by attaching I-beams or other configuration stringers to the plateaus created by the preform doubler plies. Either a mechanical attachment or a fiber reinforced resin composite attachment medium can be used. Further, the stringers can be formed of reinforced resin composite materials as well as metal or some other suitably rigid material, e.g., wood.

Figure 6:
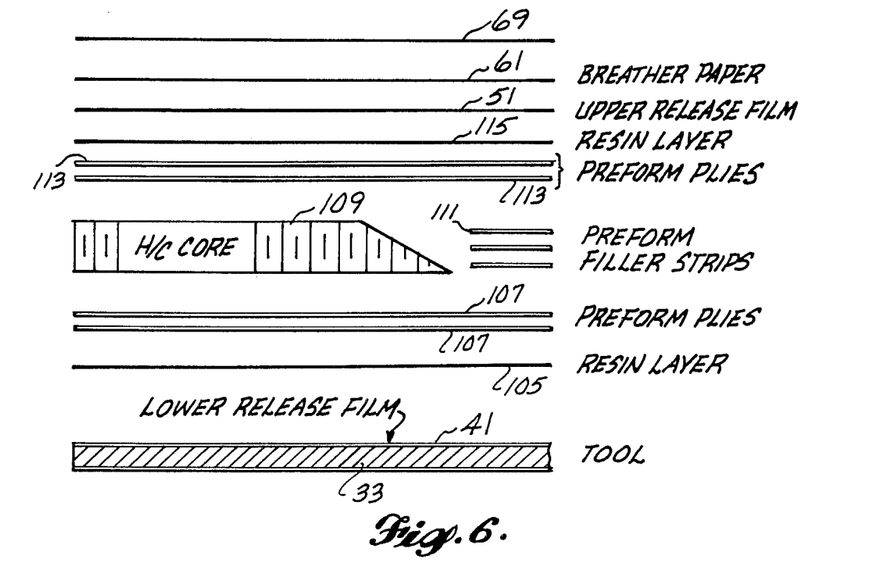
FIG. 6 is a partial cross sectional view of a further alternative embodiment of a layup formed in accordance with the invention that includes a core.

FIG. 6 illustrates a method and apparatus formed in accordance with the invention for creating a fiber reinforced resin composite having a center core formed of a honeycomb material. Alternatively, the core could be formed of wood, plastic foam or any other suitable material. As with the previously described embodiments of the invention, FIG. 6 illustrates the lower release film 41 located atop the tool 33. Located atop the lower release film 101 is the layup. The first or bottom layer of the layup is a layer of resin 105. Positioned atop the resin layer 105 are two or more lower preform plies 107. Positioned atop the lower preform plies 107 is the honeycomb core 109. As illustrated in FIG. 6, the perimeter of the honeycomb core 109 is located inside of the perimeter of the lower preform plies 107. The perimeter separation distance between the lower preform plies 107 and the honeycomb core 109 is filled with a plurality of preform filler strips 111. As with the lower preform plies 107, the preform filler strips are formed of fiber plies. Positioned above the honeycomb core 109 and the preform filler strips 111 are two or more upper preform plies 113. Positioned above the upper preform plies 113 is a second resin layer 115. Positioned above the second resin layer 115 is the upper release film 51. Located atop the upper release film 51 is one or more layers of breather paper 61. Located above the breather paper 61 is the layer of vacuum bagging film 69.

As will be appreciated from the foregoing description, in addition to including a honeycomb core 109, the layup illustrated in FIG. 6 includes a lower resin layer 105 as well as an upper resin layer 115. The lower resin layer 105 is included to make certain that resin is applied to the lower preform plies 107, particularly in the region lying beneath the honeycomb core 109. Because resin is drawn into the preform plies as the resin content control envelope is evacuated, resin can be located beneath the plies, as well as atop the plies.

Figure 7:
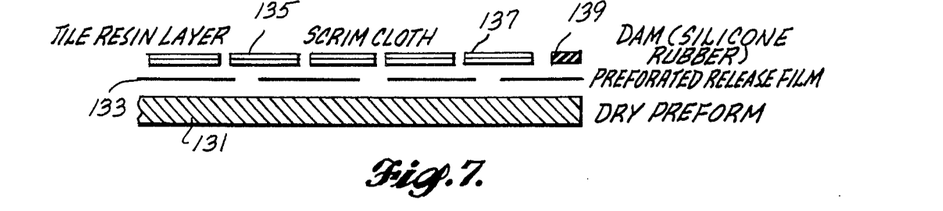
FIG. 7 is a cross-sectional view of another alternative layup formed in accordance with the invention.

As previously noted, preferably, the resin layer is formed of a plurality of tiles. The tiles may be individually supported by an internal scrim cloth that holds tile pieces together if a tile becomes damaged during handling. The disadvantage of using scrim cloth to support the tiles is that the scrim cloth may become part of the resultant monolithic structure, which may be undesirable in many circumstances. While a scrim cloth can be made of a material tough enough to be ripped from the surface of the finished part, FIG. 7 illustrates a layup modification that avoids this problem entirely. Specifically, FIG. 7 illustrates a layup wherein a perforated release film 133 is laid atop a dry preform 131. A resin layer 135 comprising resin tiles supported by scrim cloth 137 is laid atop the perforated release film 133. FIG. 7 also illustrates that a resin layer used by the invention may be surrounded by a dam 139 that prevents an excessive amount of resin from running over the edge of the layup without entering the dry preform 131. The dam may be formed of silicone rubber, for example.

Figure 8:
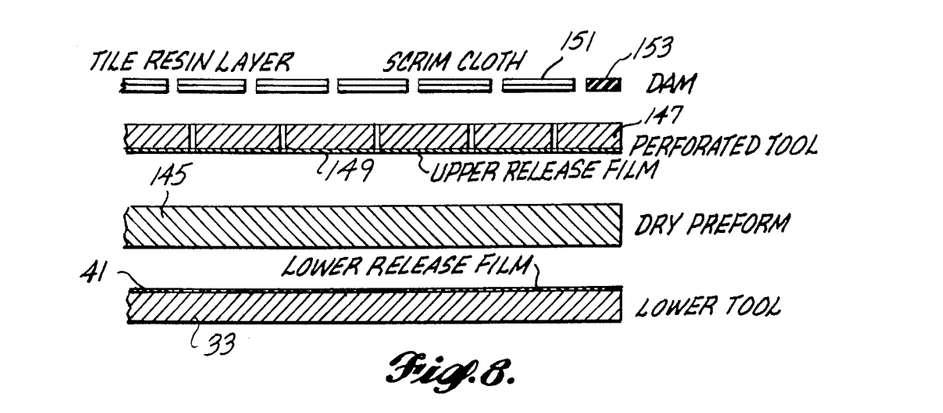
FIG. 8 is a cross sectional view of yet another layup formed in accordance with the invention.

Some structures require an upper tool as well as a lower tool so that the configuration of the upper surface as well as the lower surfaces of the resultant structure can be configured as the fiber reinforced resin composite is being formed. FIG. 8 illustrates one type of apparatus formed in accordance with the invention that includes tools located on opposite sides of the fiber reinforced resin composite as it is being formed. More specifically, FIG. 8 includes the lower tool 33 having its upper surface covered with the lower release film 41. Positioned atop the lower release film 41 is a dry preform 145. Located atop the dry preform 145 is a perforated upper tool 147 whose lower surface is coated with an upper release film or agent 149. Located above the perforated tool 147 is a resin tile layer 151 enclosed by a dam 153. When the various layers illustrated in FIG. 8 are housed in a vacuum envelope and the assembly is evacuated and heated in the manner previously described, the resin layer flows through the perforations in the perforated tool and infuses the dry preform, which is compressed between the perforated tool and the lower tool. As a result, the upper and lower surface configurations of the resulting fiber reinforced resin composite are determined by the configurations of the upper surface layer of the lower tool 33 and the lower surface of the perforated tool 147.

Figure 9:
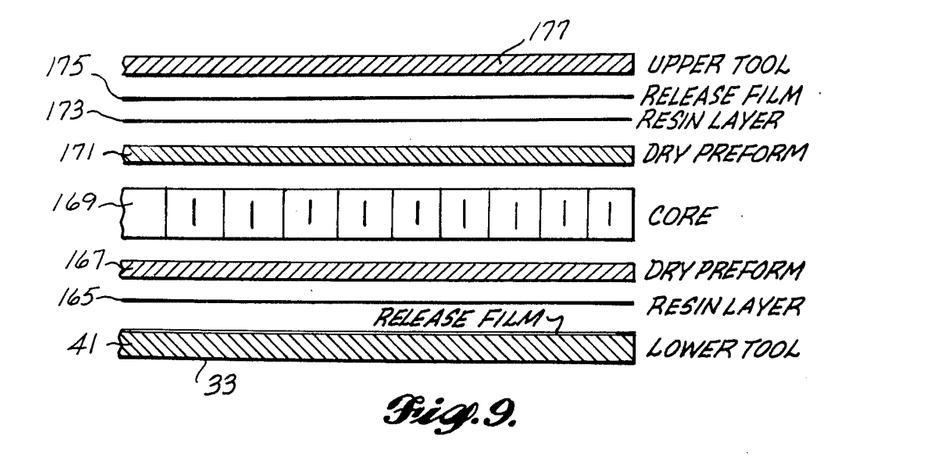
FIG. 9 is a cross sectional view of still another layup formed in accordance with the invention; and, FIG. 10 is a graph illustrating the viscosity-temperature characteristics of a variety of resins suitable for use in practicing the invention.

Some structures may require a core as well as upper and lower tools to control the top and bottom configuration of the resultant monolithic structure. FIG. 9 illustrates an assembly formed in accordance with the invention for achieving this result. More specifically, FIG. 9 illustrates the previously described lower tool 33 whose upper surface is coated with a lower release film or agent 41. Positioned atop the lower release film or agent 41 is a lower resin layer 165. Located atop the lower resin layer 165 is a lower dry preform 167. Located atop the lower dry preform 167 is a core 169 and located atop the core 169 is an upper dry preform 171. Positioned above the upper dry preform 171 is an upper resin layer 173. Located above the upper resin layer 173 is an upper tool 177 whose lower surface is covered with an upper release film or agent 175. When the assembly illustrated in FIG. 9 is mounted in a vacuum envelope and evacuated and heated in the manner previously described, the upper and lower tools press the resin layers 165 and 173 against the lower and upper dry preforms 167 and 171. The lower and upper dry preforms 167 and 171 are, in turn, pressed against the core 169. As a result, the resin layers infuse into their respective dry preforms and cause the layers of the dry preform to become fiber reinforced resin composites which are attached to the core 169 by the resin that flows completely through the dry preform. As the infusion process is a wicking phenomena, the resin melt will not run over into the core material unless the pore or cell size of the core is small enough to pull the resin into the core via a wetting/surface-tension phenomena.

Figure 10:
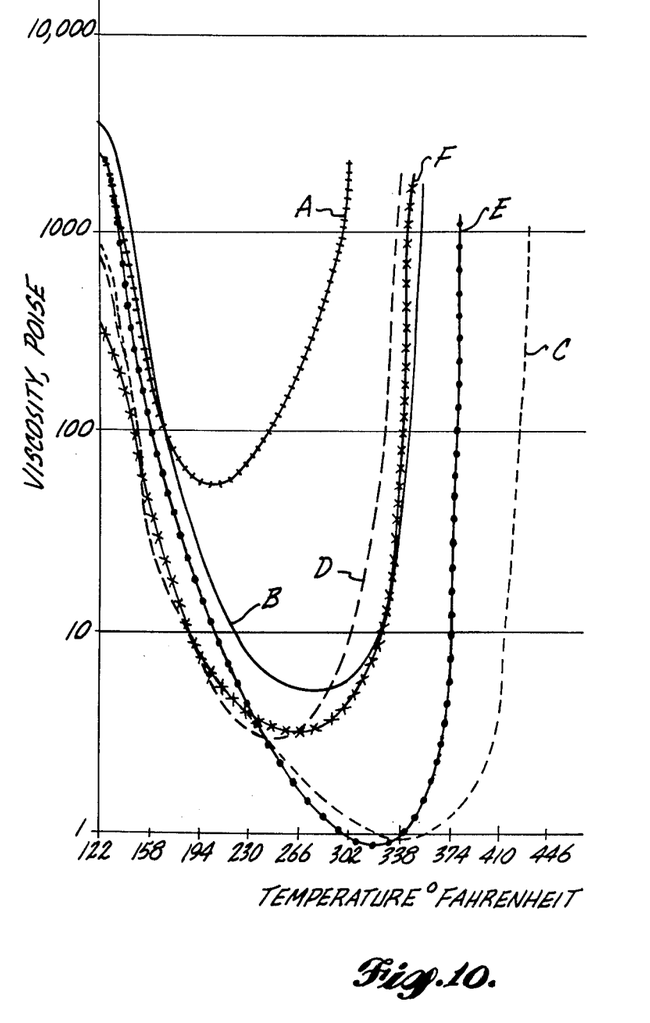

The invention is not limited to any particular type of resin. Rather, a wide variety of resins are available that will adequately flow through a dry preform when the invention is practiced in the manner heretofore described. Viscosity v. temperature curves for a variety of suitable commercially available resins are illustrated in FIG. 10. Curves A, B and C are for resins sold under product Nos. 3501-5A, 3501-6, and 3502, respectively, by Hercules, Inc., 910 Market Street, Wilmington, Del. 19899; curves D and E are for resins sold under the product Nos. 934 and 976 by Fiberite Corporation, Winona, Minn. 55987; curve D is also for a resin sold under the product No. 5208 by Narmco Materials Inc., a subsidiary of Celanese Corp., Anaheim, Calif. 92806; and, curve F is for a resin sold under the product No. R922 by Ciba-Giegy, Corp., Greensborough, N.C. 27409. As will be noted from viewing FIG. 10 the minimum viscosity of the noted resins, in terms of poise varies from less than 1 to approximately 90 over a temperature range between 200° and 340° F. In any case, the resin must be virtually free of entrained air and impurities that may boil or foam under the vacuum/temperature/pressure conditions of a particular application of the invention.

As will be readily appreciated from the foregoing description, the invention comprises a new and improved method and apparatus for creating fiber reinforced resin composites. Because the invention uses a dry preform and a resin film to create a layup difficulties associated with prior art layups using preimpregnated fiber plies are avoided. More specifically, because the preform is dry, it can be relatively easily stitched in the Z (i.e., cross-ply reinforced) direction. Further, because air and gases are evacuated from the preform as the resin infuses into the preform a porous end product is avoided. Further, because the resin material and preform material are maintained separate until a fiber reinforced resin composite is being created, losses resulting from either materials becoming unacceptable for any one of various reasons are significantly reduced because only the unacceptable material need be discarded.

While preferred embodiments of the invention have been illustrated and described, it will be appreciated that various changes can be made therein without departing from the spirit and scope of the invention. For example, the dry preform can be created by winding bundles of unidirectional fibers, e.g., tows on a mandrel, first in one direction and then in another. Or, several tows can be braided as they are wound on a mandrel. Resin can be applied to the thusly created preform while still on the mandrel (which forms a tool). Or the dry preform can be longitudinally split and flattened to create a flat layered preform to which resin is added. Or, as noted above, a flat dry preform can be created by layers of woven tows, as well as layers of unidirectional tows, or by felt-like (mat) or random swirls of fibers to which resin is added in the manner described above. Regardless of how the dry preform is created, after the resin is added it is processed in the manner described above and in the appended claims.

The embodiments of the invention in which an exclusive property or privilege is claimed are defined as follows:

1. A method of forming fiber reinforced resin composites comprising the steps of:
   creating a dry preform of at least two dry fiber plies, each of said dry fiber plies formed of a plurality of reinforcement fibers;
   adding at least one layer of resin to said dry preform;
   enclosing said dry preform and said at least one layer of resin in a resin content control envelope;
   enclosing said resin content control envelope in a vacuum envelope;
   evacuating said vacuum envelope and said resin content control envelope to withdraw air and other gases from said dry preform; and,
   heating said dry preform and said at least one layer of resin simultaneously with the evacuation of said vacuum envelope and said resin content control envelope to cause said resin to melt, fully infuse said dry preform and, then, cure as air and other gases are withdrawn from said dry preform resulting in the creation of a fiber reinforced resin composite.

2. The method claimed in claim 1 wherein said at least one layer of resin is formed of a plurality of tiles.

3. The method claimed in claim 2 wherein said plurality of tiles are supported by a scrim cloth.

4. The method claimed in claim 1 wherein each of said fiber plies is formed of a plurality of parallel oriented tows, each tow formed of a plurality of unidirectional reinforcement fibers.

5. The method claimed in claim 1 including the steps of:
   creating a second dry preform of at least two dry fiber plies, each of said fiber plies formed of a plurality of reinforcement fibers; and,
   positioning said second dry preform atop said dry preform.

6. The method claimed in claim 5 wherein said at least one layer of resin is formed of a plurality of tiles.

7. The method claimed in claim 6 wherein said plurality of tiles are supported by a scrim cloth.

8. The method claimed in claim 5 wherein each of said dry fiber plies is formed of a plurality of parallel oriented tows, each tow formed of a plurality of unidirectional reinforcement fibers.

9. The method claimed in claim 5 including the step of adding a second layer of resin to said dry preform.

10. The method claimed in claim 9 wherein said layers of resin are formed of a plurality of tiles.

11. The method claimed in claim 10 wherein said plurality of tiles are supported by a scrim cloth.

12. The method claimed in claim 9 wherein each of said dry fiber plies is formed of a plurality of parallel oriented tows, each tow formed of a plurality of unidirectional reinforcement fibers.

13. The method claimed in claim 9 including the step of positioning a core between said dry preform and said second dry preform.

14. The method claimed in claim 13 wherein said layers of resin are formed of a plurality of tiles.

15. The method claimed in claim 14 wherein said plurality of tiles are supported by a scrim cloth.

16. The method claimed in claim 13 wherein each of said dry fiber plies is formed of a plurality of parallel oriented tows, each tow formed of a plurality of unidirectional reinforcement fibers.

17. The method claimed in claim 13 wherein said core is a honeycomb core.

18. The method claimed in claim 1 including a step of creating a plurality of stacks of preform doubler plies atop said dry preform.

19. The method claimed in claim 18 wherein said at least one layer of resin is formed of a plurality of tiles.

20. The method claimed in claim 19 wherein said plurality of tiles are supported by a scrim cloth.

21. The method claimed in claim 18 wherein each of said dry fiber plies is formed of a plurality of parallel oriented tows, each tow formed of a plurality of unidirectional reinforcement fibers.

22. The method claimed in claim 1 including the step of positioning a lower release film beneath said dry preform and said at least one layer of resin, said lower release film forming part of said resin content control envelope.

23. The method claimed in claim 22 including the step of positioning an upper release film atop said dry preform, said upper release film also forming part of said resin content control envelope.

24. The method claimed in claim 23 wherein said at least one layer of resin is located between said upper release film and said dry preform.

25. The method claimed in claim 24 wherein said upper and lower release films are joined by vacuum sealer tape located around the periphery of said dry preform.

26. The method claimed in claim 25 including the step of positioning at least one layer of inner breather tape adjacent to said dry preform, inside of said resin content control envelope.

27. The method claimed in claim 26 including the step of positioning at least one layer of vacuum port breather tape between said upper and lower release films and across said vacuum sealer tape that joins said upper and lower release films to provide a gas conduit between said inner breather tape and the exterior of said resin content control envelope.

28. The method claimed in claim 23 including a perforated release film located between said at least one layer of resin and said dry preform.

29. The method claimed in claim 28 wherein said upper and lower release films are joined by vacuum sealer tape located around the periphery of said dry preform.

30. The method claimed in claim 29 including the step of positioning at least one layer of inner breather tape adjacent to said dry preform, inside of said resin content control envelope.

31. The method claimed in claim 30 including the step of positioning at least one layer of vacuum port breather tape between said upper and lower release films and across said vacuum sealer tape that joins said upper and lower release films to provide a gas conduit between said inner breather tape and the exterior of said resin content control envelope.

32. The method claimed in claim 23 including the step of positioning said lower release film atop a lower tool.

33. The method claimed in claim 32 including the step of positioning an upper tool atop said dry preform.

34. The method claimed in claim 33 wherein said at least one layer of resin is located between said upper tool and said dry preform.

35. The method claimed in claim 34 wherein said upper release film is located between said upper tool and said at least one layer of resin.

36. The method claimed in claim 33 wherein said upper tool is perforated and located between said at least one layer of resin and said dry preform.

37. The method claimed in claim 36 including a perforated release film located between said upper tool and said dry preform.

38. Apparatus for creating monolithic structures formed of layers of plies joined by a cured resin, said apparatus comprising:
(a) a vacuum envelope including first conduit means for connecting said vacuum envelope to a vacuum source, said vacuum envelope comprising:
  (i) a lower tool;
  (ii) a gas impervious layer; and,
  (iii) vacuum attachment means for attaching said gas impervious layer to said lower tool such that a vacuum envelope is formed between said gas impervious layer and said lower tool;
(b) a resin content control envelope positioned within said vacuum envelope for enclosing a monolithic structure as it is being formed, said monolithic structure created from a dry preform formed of a plurality of dry plies and at least one layer of resin, said resin content control envelope comprising:
  (i) a lower release film located atop said lower tool;
  (ii) an upper release film positioned atop said lower release film and beneath said gas impervious layer; and,
  (iii) vacuum attachment means for attaching said upper and lower release films together such that said resin content control envelope is formed between said upper and lower release films;
  (c) an upper tool located between said gas impervious layer and said upper release film; and,
(d) second conduit means positioned inside of said vacuum envelope and said resin content control envelope for providing a path for air and other gases between said dry preform and said first conduit means as said monolithic structure is created.

39. Apparatus as claimed in claim 38 wherein said second conduit means comprises:
at least one layer of inner breather tape positioned adjacent said dry preform within said resin content control envelope;
at least one layer of vacuum port breather tape extending between the interior of said resin content control envelope and the exterior of said resin content control envelope; and,
at least one layer of outer breather tape extending between said vacuum port breather tape and said first conduit means.

40. Apparatus as claimed in claim 39 wherein said second conduit means comprises several layers of inner breather tape, several layers of vacuum port breather tape and several layers of outer breather tape.

41. Apparatus as claimed in claim 40 wherein said inner breather tape layers surround the periphery of said dry preform, inside of said resin content control envelope.

42. Apparatus as claimed in claim 39 wherein said upper tool is perforated and the lower surface of said upper tool is covered by a correspondingly perforated release film.

43. Apparatus as claimed in claim 42 wherein said second conduit means comprises several layers of inner breather tape, several layers of vacuum port breather tape and several layers of outer breather tape.

44. Apparatus as claimed in claim 43 wherein said inner breather tape surrounds the periphery of said dry preform, inside of said resin content control envelope.

45. Apparatus for creating monolithic structures formed of layers of plies joined by a cured resin, said apparatus comprising:
a vacuum envelope including first conduit means for connecting said vacuum envelope to a vacuum source;
a resin content control envelope positioned within said vacuum envelope for enclosing a monolithic structure as it is being formed, said monolithic structure created from a dry preform formed of a plurality of plies and at least one layer of resin; and,
second conduit means positioned inside of said vacuum envelope and said resin content control envelope for providing a path for air and other gases between said dry preform and said first conduit means as said monolithic structure is created, said second conduit means comprising:
at least one layer of inner breather tape positioned adjacent said dry preform within said resin content control envelope;
at least one layer of vacuum port breather tape extending between the interior of said resin content control envelope and the exterior of said resin content control envelope; and,
at least one layer of outer breather tape extending between said vacuum port breather tape and said first conduit means.

46. Apparatus as claimed in claim 45 wherein said resin content control envelope comprises:
   a lower release film;
   an upper release film positioned atop said lower release film; and,
   vacuum attachment means for attaching said upper and lower release films together such that said resin content control envelope is formed between said upper and lower release films.

47. Apparatus as claimed in claim 45 wherein said second conduit means comprises several layers of inner breather tape, several layers of vacuum port breather tape and several layers of outer breather tape.

48. Apparatus as claimed in claim 47 wherein said resin content control envelope comprises:
   a lower release film;
   an upper release film positioned atop said lower release film; and,
   vacuum attachment means for attaching said upper and lower release films together such that said resin content control envelope is formed between said upper and lower release films.

49. Apparatus as claimed in claim 45 wherein said inner breather tape layers surround the periphery of said dry preform, inside of said resin content control envelope.

50. Apparatus as claimed in claim 49 wherein said resin content control envelope comprises:
   a lower release film;
   an upper release film positioned atop said lower release film; and,
   vacuum attachment means for attaching said upper and lower release films together such that said resin content control envelope is formed between said upper and lower release films.

51. Apparatus as claimed in claim 50 wherein said second conduit means comprises several layers of inner breather tape, several layers of vacuum port breather tape and several layers of outer breather tape.

52. Apparatus as claimed in claim 51 wherein said resin content control envelope comprises:
   a lower release film;
   an upper release film positioned atop said lower release film; and,
   vacuum attachment means for attaching said upper and lower release films together such that said resin content control envelope is formed between said upper and lower release films.

* * * * *